(12) United States Patent  
Desai et al.

(10) Patent No.: US 11,136,673 B2
(45) Date of Patent: Oct. 5, 2021

(54) METHOD OF SURFACE MICRO-TEXTURING WITH A SUBTRACTIVE AGENT

(71) Applicant: The Boeing Company, Chicago, IL (US)

(72) Inventors: Raj Desai, Mount Pleasant, SC (US); Caitlin Elizabeth Auffinger, Ladson, SC (US); Conor Van Camp, North Charleston, SC (US); Edward Greene, Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/271,116

(22) Filed: Feb. 8, 2019

(65) Prior Publication Data

US 2020/0255956 A1 Aug. 13, 2020

(51) Int. Cl.
| | |
|---|---|
| *C23F 1/08* | (2006.01) |
| *B33Y 40/00* | (2020.01) |
| *B05C 5/00* | (2006.01) |
| *C23F 1/02* | (2006.01) |

(52) U.S. Cl.
CPC ............ *C23F 1/08* (2013.01); *B05C 5/002* (2013.01); *B33Y 40/00* (2014.12); *C23F 1/02* (2013.01)

(58) Field of Classification Search
None
See application file for complete search history.

(56) References Cited

U.S. PATENT DOCUMENTS

| | | | |
|---|---|---|---|
| 5,988,568 A | 11/1999 | Drews | |
| 6,872,321 B2* | 3/2005 | Thavarajah | B41J 2/01 216/40 |
| 8,733,702 B1 | 5/2014 | Rawlings et al. | |
| 2003/0071019 A1* | 4/2003 | Cline | C23F 1/26 216/109 |
| 2004/0074870 A1* | 4/2004 | Koike | C23F 1/02 216/83 |
| 2006/0213870 A1 | 9/2006 | Waldrop et al. | |

(Continued)

FOREIGN PATENT DOCUMENTS

| | | |
|---|---|---|
| DE | 102006004644 A1 | 8/2007 |
| DE | 102007062123 A1 | 6/2009 |

(Continued)

OTHER PUBLICATIONS

Denkena, Berend., et al. Abstract of Manufacturing of Functional Riblet Structures by Profile Grinding, CIRP Journal Manufacturing Science and Technology, vol. 3, Issue 1, 2010, pp. 14-26, published 2010, retrieved from the enternet https://www.sciencedirect.com/science/article/abs/pii/S1755581710000738?via%3Dihub#aep-abstract-id27 on Feb. 7, 2019, 2 pages.

(Continued)

*Primary Examiner* — Roberts P Culbert
(74) *Attorney, Agent, or Firm* — Kolisch Hartwell, P.C.

(57) ABSTRACT

A method of micro-texturing a substrate surface is disclosed, including printing a maskant on the substrate surface to define exposed surface zones on the substrate surface. The method further includes forming a micro-texture on the substrate surface by removing material from the exposed surface zones, and removing the maskant from the substrate surface.

20 Claims, 5 Drawing Sheets

(56) References Cited

U.S. PATENT DOCUMENTS

| | | | |
|---|---|---|---|
| 2006/0216476 A1* | 9/2006 | Ganti | C23C 18/02 428/143 |
| 2007/0020970 A1* | 1/2007 | Miller | B25H 3/04 439/78 |
| 2007/0134825 A1 | 6/2007 | Zou et al. | |
| 2010/0187359 A1 | 7/2010 | Rawlings et al. | |
| 2010/0187360 A1 | 7/2010 | Rawlings et al. | |
| 2010/0187361 A1 | 7/2010 | Rawlings et al. | |
| 2011/0039362 A1 | 2/2011 | Long et al. | |
| 2011/0210096 A1* | 9/2011 | Raji | F04D 29/023 216/49 |
| 2013/0062004 A1 | 3/2013 | Amirehteshami et al. | |
| 2013/0273745 A1 | 10/2013 | Shim | |
| 2014/0305583 A1 | 10/2014 | Casset | |
| 2015/0009254 A1 | 1/2015 | Kaiba et al. | |

FOREIGN PATENT DOCUMENTS

| | | | |
|---|---|---|---|
| DE | 102008042237 A1 | 4/2010 | |
| DE | 102013102896 A1 | 9/2013 | |
| EP | 0216384 A2 | 4/1987 | |
| EP | 0216384 A3 | 11/1987 | |
| EP | 2243618 A1 | 10/2010 | |
| EP | 2868391 A1 | 5/2015 | |
| WO | 8911343 A2 | 11/1989 | |
| WO | 8911343 A3 | 11/1989 | |
| WO | 0183391 A1 | 11/2001 | |
| WO | 2003087604 A1 | 10/2003 | |
| WO | 2005030472 A1 | 4/2005 | |
| WO | 2008021780 A1 | 2/2008 | |
| WO | 2013083682 A1 | 6/2013 | |

OTHER PUBLICATIONS

Romans, T., et al. Rolling Rolling of Drag Reducing Riblet Surfaces, American Institute of Aeronautics and Astronautics, Apr. 12-15, 2010, retrieved on Nov. 29, 2018, 10 page.

Klocke, F., et al. Abstract of Development of an Incremental Rolling Process for the Production of Defined Riblet Surface Structures, Springer for Research & Development, vol. 1, Issue 3, pp. 233-237, published Nov. 2007, retrieved from the enternet https://rd.springer.com/article/10.1007/s11740-007-0031-y on Feb. 7, 2019, 4 pages.

Denkena, Berend., et al. Abstract of Influence of 5-Axes-Kinematics Geometrical Accuracy in Riblet Manufacturing Processes, New Production Technologies in Aerospace Industry pp. 69-74, published Sep. 19, 2013, retrieved from the enternet https://rd.springer.com/chapter/10.1007%2F978-3-319-01964-2_10 on Feb. 7, 2019, 5 pages.

McLean, Doug. Understanding Aerodynamics, Arguing From The Real Physics, retrieved Nov. 9, 2018, 7 pages.

Bilinsky, H. Microfabrication of Riblets for Drag Reduction, AIAA SciTech Forum, published Jan. 9-13, published 2017, retrieved Nov. 29, 2018, 11 pages.

European Patent Office, Extended European Search Report regarding European Patent Application No. 20154409.5, dated Jul. 10, 2020, 7 pages.

European Patent Office, Extended European Search Report regarding European Patent Application No. 20154215.6, dated May 28, 2020, 7 pages.

U.S. Patent and Trademark Office, Non-Final Office Action regarding U.S. Appl. No. 16/270,995, dated May 15, 2020, 13 pages.

U.S. Patent and Trademark Office, Final Office Action regarding U.S. Appl. No. 16/270,995, dated Nov. 27, 2020, 24 pages.

* cited by examiner

METHOD OF SURFACE MICRO-TEXTURING WITH A SUBTRACTIVE AGENT

FIELD

This disclosure relates to systems and methods for micro-texturing a surface. More specifically, the disclosed examples relate to controlled application of a subtractive agent to form microstructures on a surface.

INTRODUCTION

Texturing of aerodynamic surfaces for drag reduction, increased lift, or other desirable aerodynamic properties is an ongoing area of research. Potential applications range from golf balls, to surf boards, to airplanes. However, practical fabrication of durable surface textures remains an obstacle to implementation, particularly for economically viable large-scale production. Existing manufacturing methods are typically slow, costly, and/or produce materials of limited durability.

Riblet microstructures are an example of a drag-reducing surface texture that has been researched for decades, demonstrated to provide up to a 10% reduction in skin friction, but has not yet been implemented on commercial aircraft due to manufacturing challenges. Riblets are a pattern of alternating ridges and grooves, approximately aligned with the direction of airflow that reduce drag by inhibiting turbulence in the boundary layer. Sharp, narrow ridges are most effective, and though appropriate spacing depends on the expected flow conditions, typical spacing is on the order of thousandths of an inch (mil) or tens of micrometers (µm).

Traditional methods such as machining or grinding are not well suited to precise manufacturing of such small-scale structures. Current techniques include molding riblets in thin sheets of a material such as a plastic film, which are then applied to the aerodynamic surface. However, precise positioning and successful bonding of such sheets over large areas can be difficult and time-consuming, and the plastic films can degrade under atmospheric conditions.

SUMMARY

The present disclosure provides systems, apparatuses, and methods relating to micro-texturing a substrate surface. In some examples, a method of micro-texturing a substrate surface may include printing a maskant on the substrate surface to define exposed surface zones on the substrate surface. The method may further include forming a micro-texture on the substrate surface by removing material from the exposed surface zones, and removing the maskant from the substrate surface.

In some examples, an apparatus for creating a micro-texture on a substrate surface may include a maskant reservoir, a printer, and a controller. The printer may include a nozzle assembly configured to dispense a maskant from the maskant reservoir onto the substrate surface. The controller may be programmed to move the first nozzle assembly relative to the substrate surface to deposit the maskant on the substrates surface in a pattern exposing etching surface regions configured for generating a micro-textured surface on the substrate surface.

In some examples, a method for generating a micro-texture on a substrate surface may include connecting a nozzle to a printer, the nozzle being configured to deposit a maskant onto the substrate surface. The method may further include printing the maskant through the nozzle onto the substrate surface in a pattern defining locations of peaks in the micro-texture. The method may further include removing material from the substrate surface between the locations of the peaks, and removing the maskant from the substrate surface.

Features, functions, and advantages may be achieved independently in various examples of the present disclosure, or may be combined in yet other examples, further details of which can be seen with reference to the following description and drawings.

DETAILED DESCRIPTION

Figure 1:
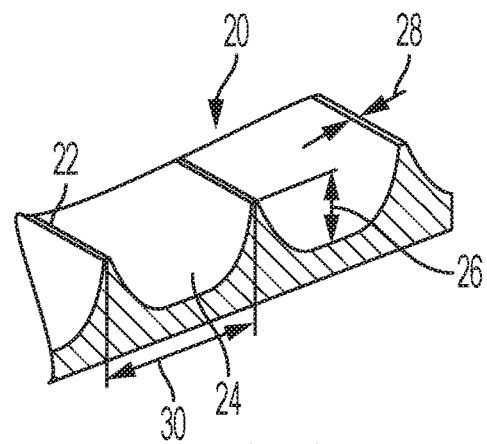
FIG. 1 is a schematic diagram of an illustrative micro-texture in accordance with aspects of the present disclosure.

Various aspects and examples of a method for micro-texturing a surface and a related apparatus, are described below and illustrated in the associated drawings. Unless otherwise specified, a method or apparatus in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

In general, a method of micro-texturing a surface in accordance with the present teachings may include controlled deposition of a masking material onto the surface of a substrate. Droplets of the masking material may be deposited in a pattern over the surface, and a subtractive agent may subsequently be applied to the surface. The masking material and/or the subtractive agent may be selected such that the masking material resists dissolving by the subtractive agent, the masking material is non-reactive with the substrate, the masking material is non-reactive with the subtractive agent, and/or the masking material is inert. In some examples, the masking material may be cured, dried, and/or bonded prior to application of the subtractive agent.

The subtractive agent may be allowed to dissolve a portion of those areas of the substrate surface not covered by the deposited masking material. The subtractive agent and dissolved material may then be removed from the substrate. The mask may be removed from the substrate, for instance by application of a corresponding solvent. The pattern in which maskant droplets are deposited, droplet size, and other factors such as time elapsed before removal of the subtractive agent may be selected to form a desired micro-texture on the surface of the substrate. A method in accordance with the present teachings may also be described as etching and/or chemical milling of a micro-texture into a surface.

A method of micro-texturing a surface in accordance with the present teachings may be performed at least in part with an inkjet printer, an inkjet style of printer apparatus, and/or a printer assembly including a drop-on-demand printhead. The masking material may be thereby printed onto the surface of the substrate. The inkjet printer or printer assembly may include a robotic assembly. The inkjet printer or printer assembly may include a programmable controller, which may be programmed to deposit the masking material onto a curved surface of the substrate. The inkjet printer or printer assembly may additionally or alternatively include a control system configured to allow real-time control by a user and/or dynamically alter deposition in response to real-time feedback such as sensor data. For example, a control system may alter a volume of masking material deposited in response to a difference between a measured and a programmed surface position.

The substrate may be a top layer of material a manufactured part, component, and/or article, and/or may be a top layer of a material for use in manufacture of parts, components, and/or articles. The substrate may be a sacrificial portion of a material, may include an additively manufactured layer, and/or may include a layer applied to the material. For example, the substrate may include a portion of the aluminum of an aircraft wing skin, may include a paint coating over some or all of a complete aircraft, and/or may include a polymer cured onto a composite used in manufacture of aircraft exterior surfaces. A layer may be applied for the purpose of forming a micro-texture and/or may be intended to serve other functions such as protective coating of the substrate. The substrate may include a single material, a combination of materials, and/or may be a composite material.

The subtractive agent may include any chemical and/or combination of chemicals appropriate to dissolve the substrate. The subtractive agent may also be referred to as an etchant and/or a chemical milling agent. The subtractive agent may be selected according to the material of the substrate which is to be micro-textured. The subtractive agent may also be selected for a desired etching strength or potential, and/or a desired viscosity or other hydrodynamic properties. Selection of an appropriate subtractive agent may facilitate creation of a micro-texture on a desired scale and with a desired precision.

The masking material may include any chemical and/or combination of chemicals appropriate protect the substrate from the subtractive agent. The masking material may also be referred to as a maskant and/or a resist. The masking material may be selected according to the selected subtractive agent and/or the substrate which is to be micro-textured. The masking material may also be selected for a desired bonding properties, cure time, ease of removal, and/or a desired viscosity or other hydrodynamic properties.

A micro-texture may comprise a pattern of micro or nano-scale structures, which may be referred to as surface features or microstructures. A method of micro-texturing a surface in accordance with the present teachings may also be described as creating surface features by removing material around selected feature locations, by use of a subtractive agent.

Figure 2:
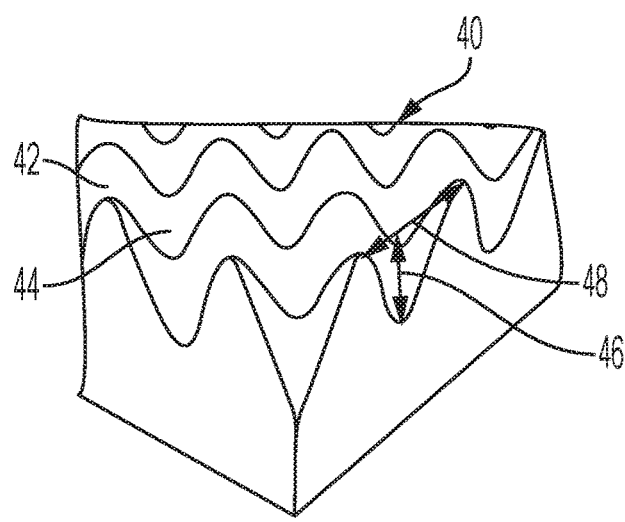
FIG. 2 is a schematic diagram of another illustrative micro-texture.

The surface features of a micro-texture may not be visible to the naked eye. In other words, individual surface features may require use of magnification to be optically distinguished. However, the plurality of surface features forming a micro-texture may change overall visual properties of a surface, such as reflectivity. The surface features may interact with fluids such as air and water that are incident on or flow over a micro-textured surface, to affect the fluid dynamics of the surface. FIGS. 1 and 2 show two illustrative micro-textures, which have desirable fluid dynamic effects. The methods and apparatus described herein may also be applied to create other micro-textures and/or surface features that are currently known or are as yet unknown.

FIG. 1 is a diagram of a riblet micro-texture 20, comprising a pattern of alternating riblets 22 and grooves 24. The riblets may also be described as ridges, micro-riblets, and/or linear protrusions. As noted above, when aligned with a direction of airflow, the riblets reduce skin friction drag by inhibiting lateral turbulence motions near the bottom of the boundary layer of air. The effectiveness of the riblets and extent of the drag reduction depend on properties of the airflow such as the Reynolds number, and multiple parameters of the riblets. Each riblet 22 has a height 26 measured from the bottom of adjacent grooves 24 to the tip of the riblet, and a tip width 28. Adjacent riblets 22 are spaced by a distance 30. In other words, the width of grooves 24 is defined by spacing (i.e. distance) 30 between riblet tips.

In the present example, a scalloped riblet shape is depicted, but riblets may have a variety of profiles including triangular and blade profiles. Generally, studies of drag reduction for different riblet profiles and geometries suggest that sharp, narrow riblets are most effective. Spacing 30 may be determined according to an expected Reynolds number. For example, a spacing of between 3 and 4 mil or between 75 and 100 μm may be effective for a Reynolds number of 1.7, which is typical of flight at Mach number 0.85 at an altitude of 35,000 feet. For another example, a spacing selected from a range between 1 and 10 mil or between 25 and 250 µm may be effective for flight at many conventional speeds and altitudes. Height 26 may be determined in relation to spacing 30. A height of half spacing (i.e. distance) 30 or greater has been shown to be most effective. For example, height 26 may be selected from a range of 15 and 20 mil or 35 and 50 µm, for a spacing between 3 and 4 mil or between 75 and 100 µm.

Turbulence models for specific surfaces and/or applications may be used in Computational Fluid Dynamics (CFD) calculations to design effective riblet patterns and/or dimensions. Effective riblets parameters may vary over a surface, particularly surfaces having complex curvature. For example, in regions away from the leading edge of a surface, greater riblet spacing 30 may yield improved drag reduction as compared with regions adjacent the leading edge.

FIG. 2 is a diagram of an illustrative artificial lotus micro-texture 40, which may also be referred to as a lotus leaf micro-texture and/or a lotus leaf surface. The surface of a natural lotus leaf is covered in papillae approximately 10-20 µm in height and width. Together with a wax coating, these papillae render the leaf's surface ultrahydrophobic. Water droplets on the surface have a contact angle close to or exceeding 150 degrees, minimizing adhesion to the surface. Artificial ultrahydrophobic microstructures and nanostructures have been studied for a variety of applications, particularly in biotechnology. Such structures have also been suggested for anti-fouling and anti-icing applications on aircraft surfaces.

The artificial lotus micro-texture shown in FIG. 2 includes a pattern of rounded towers 42 and troughs 44. The texture may be described as having unitary roughness. Each tower 42 has a height 46 measured from the bottom of adjacent troughs 44 to the peak of the tower. The width of troughs 44 is defined by a spacing 48 between tower peaks. Generally, minimizing the width of towers 42 and increasing spacing 48 may increase the contact angle and hydrophobicity of the surface.

Figure 3:
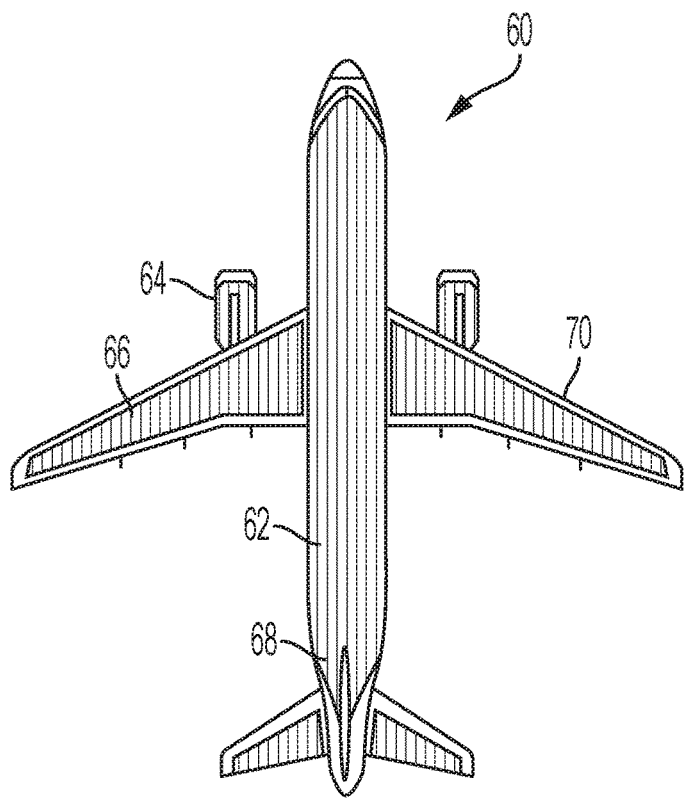
FIG. 3 is a schematic diagram of an illustrative aircraft including micro-textured exterior surfaces.

FIG. 3 is a diagram of an illustrative aircraft 60, including drag-reducing micro-textured surfaces. An exterior skin 62 of the aircraft includes multiple drag-reduction zones 64, which have micro-texturing such as riblets. Drag-reduction zones 64 cover a large proportion of exterior skin 62, including wings 66 and fuselage 68. However, some aerodynamically distinct sections of exterior skin 62 such as leading edges 70 of wings 66 do not include micro-texturing. Appropriate and effective disposition of drag-reduction zones 64 may form part of the aerodynamic design of aircraft 60.

In the depicted example, aircraft 60 is a commercial jet. Drag-reduction zones 64 may also be used on an exterior skin of other aircraft such as helicopters or drones, or on exterior surfaces of other vehicles such as cars, trains, or ships. In some examples, ultrahydrophic zones and/or areas having other desired fluid dynamic effects may be used in combination and/or in place of drag-reduction zones 64. In some examples, micro-textures surfaces produced using the methods or apparatus described herein may be applied to non-vehicle systems such as sports equipment, projectiles, and/or any system having surfaces subject to fluid dynamic effects.

Aspects of a method or apparatus for micro-texturing a surface may be embodied as a computer method, computer system, or computer program product. Accordingly, aspects of the method or apparatus may take the form of an entirely hardware example, an entirely software example (including firmware, resident software, micro-code, and the like), or an example combining software and hardware aspects, all of which may generally be referred to herein as a "circuit," "module," or "system." Furthermore, aspects of the method or apparatus may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of a method of micro-texturing a surface may be written in one or any combination of programming languages, including an object-oriented programming language such as Java, Smalltalk, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of a method of micro-texturing a surface are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA) or a programmable logic controller (PLC).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the method of micro-texturing a surface. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following sections describe selected aspects of exemplary methods of micro-texturing a surface with a subtractive agent as well as related systems and/or apparatus. The examples in these sections are intended for illustration and should not be interpreted as limiting the entire scope of the present disclosure. Each section may include one or more distinct examples, and/or contextual or related information, function, and/or structure.

A. Illustrative Micro-Texturing Printer Apparatus

Figure 4:
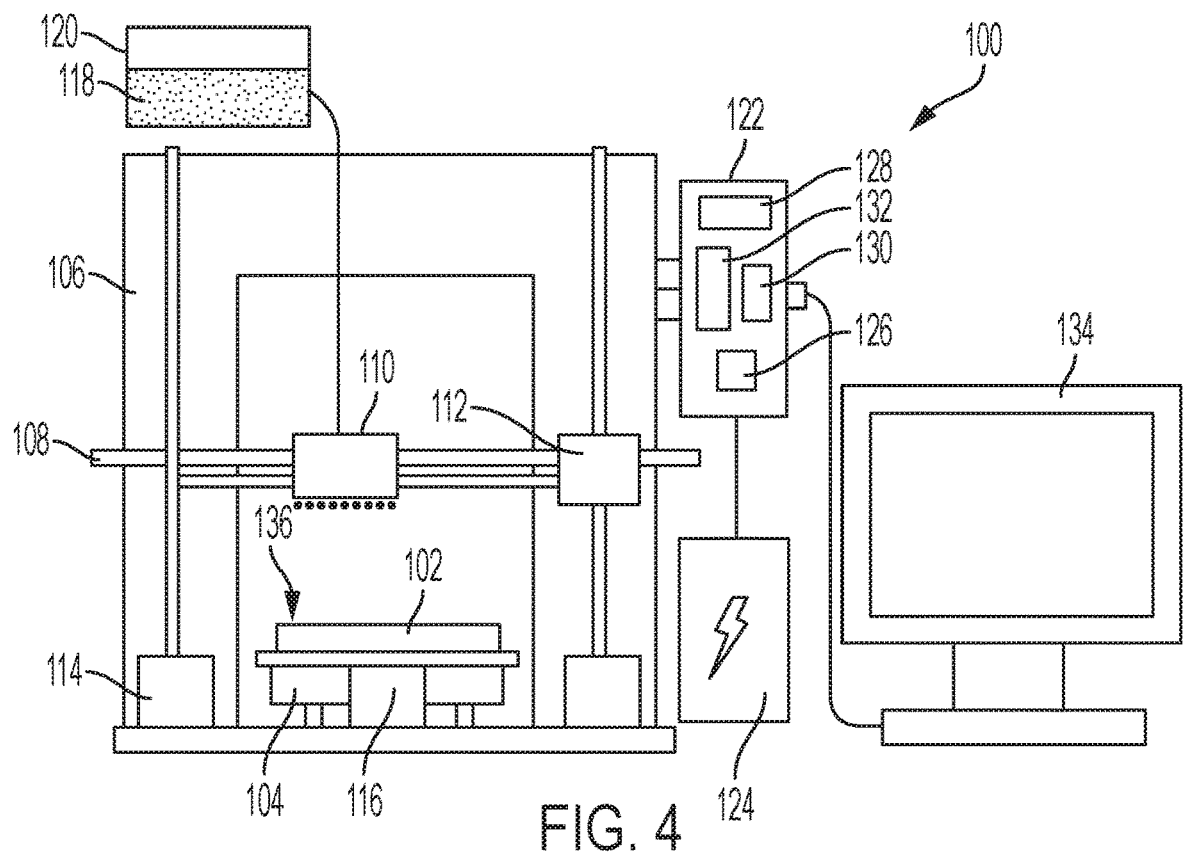
FIG. 4 is a schematic diagram of an illustrative micro-texturing printer apparatus as described herein.
Figure 5:
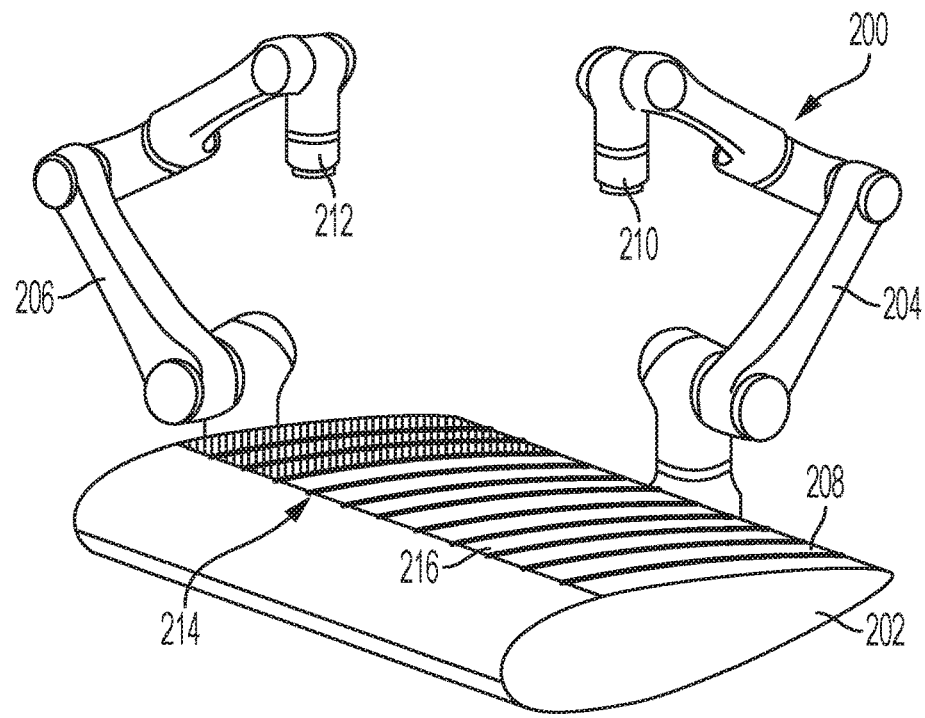
FIG. 5 is a schematic diagram of another illustrative micro-texturing printer apparatus as described herein.

As shown in FIGS. 4 and 5, this section describes two illustrative apparatus for micro-texturing a surface. Micro-texturing apparatus 100, shown in FIG. 4, may be appropriate for use with surfaces on objects or materials of limited dimensions. That is, apparatus 100 may be appropriate for use with a workpiece 102 that can be supported on and/or fed over a printing platform 104. Micro-texturing apparatus 200, shown in FIG. 5, may be appropriate for use on large or complex surfaces, and may be configured for mobility relative to a large workpiece 202.

Micro-texturing apparatus 100 includes a printer 106, with a gantry 108 disposed over printing platform 104. A nozzle assembly 110 is mounted on gantry 108. The gantry includes one or more x-axis motors 112 and z-axis motors 114, and printing platform 104 includes one or more y-axis motors 116. Together gantry 108 and printing platform 104 provide control of the positioning of nozzle assembly 110 relative to workpiece 102. In some examples, gantry 108 may further include rotational actuators, to allow control of the orientation of nozzle assembly 110 relative to workpiece 102. The depicted example may be effective for workpieces having a flat surface, while apparatus including orientation control may allow micro-texturing of curved and/or complex surfaces.

Nozzle assembly 110 includes an inkjet printhead with one or more nozzles. Printer 106 may therefore be referred to as an inkjet printer. The inkjet printhead may operate on thermal bubble, piezoelectric, and/or any effective principles. In some examples, nozzle assembly 110 may include other mechanisms appropriate for controlled deposition of fluid droplets. Nozzle assembly 110 is supplied with a maskant fluid 118 from a cartridge or reservoir 120. The reservoir and nozzle assembly are each comprised and/or lined with material appropriate for transport of maskant fluid 118.

Micro-texturing apparatus 100 further includes a controller 122 and a power supply 124. Controller 122 may be a standard controller adapted from an additive manufacturing printer and/or an ink printer. Controller 122 may also be specifically designed for control of printer 106.

Controller 122 may be a programmable logic controller system (also referred to as a PLC system) suitable for implementing aspects of micro-texturing controls in accordance with aspects of the present disclosure. The controller may be an example of a data processing system. Controller 122 includes a central processing unit (CPU) 126, and a memory 128 for storing instructions and parameters necessary to carry out relevant automation tasks.

Controller 122 includes an input module 130 in receiving communication with one or more input devices/sensors, and an output module 132 in outgoing communication with one or more output devices. Input module 130 may convert analog signals from input devices/sensors into digital and/or logic signals that the controller can use. Upon evaluating the input(s), along with known output states and stored program parameters and instructions, CPU 126 may execute one or more predetermined commands to control one or more output devices, such as nozzle assembly 110 and/or motors 112, 114, 116. Output module 132 may convert control signals from CPU 126 into digital or analog signals which may be used to control the various output devices.

Input and output modules 130, 132 may also allow for input and output of data with other devices that may be connected to controller 122. For example, input module 130 may provide a connection for temperature or pressure measurements, nozzle status, etchant reservoir level status, other suitable input device. Output module 132 may send output to an actuator, indicator, motor controller, machine, display, and/or any other suitable output device.

A programming device may interface with controller 122 to facilitate the input of instructions and settings and/or to monitor printer operation. Programming devices may include, for example, a handheld computer or personal computer. In the present example, controller 122 is connected to a desktop computer 134 via hardwired connection such as a Universal Serial Bus (USB) connection. The controller may be configured to receive instructions from a program running on computer 134, such as a printer driver. In some examples, micro-texturing apparatus 100 may include software executable on a computer to generate instructions for a printer driver and/or controller 122.

Printer 106 may additionally or alternatively include a human machine interface (HMI) in communication with controller 122. The HMI may facilitate a user-friendly and interactive interface with the printer processes and controls. The HMI may also assist an operator in determining printer conditions, in changing printer settings, displaying faults, and/or making real-time alterations to the printing processes based on measured or observed results. An HMI and/or programming device may provide for communications with other data processing systems or devices, e.g., through the use of physical and/or wireless communications links.

Printer 106 is configured to print maskant fluid 118 onto a surface 136 of workpiece 102. Printing may include dispensing droplets of maskant fluid 118 from reservoir 120 through nozzle assembly 110 onto surface 136 in a pattern that defines exposed surface zones corresponding to a micro-texture. Controller 122 is programmed to move nozzle assembly 110 relative to surface 136, using motors 112, 114, 116. As noted above, controller 122 may be programmed using an HMI and/or by transmitting instructions from a programming device such as computer 134. Programming of controller 122 may also be referred to as programming of printer 106 and/or micro-texturing apparatus 100.

In some examples, printer 106 may be programmed to print a pattern configured to generate riblets on surface 136. In such examples, nozzle assembly 110 may be configured to dispense droplets of maskant fluid 118 of a size configured to generate riblets 22 (see FIG. 1) with a tip width 28 in a range of 1 to 10 μm. Printer 106 may be configured and/or programmed to generate riblets 22 of any desired dimensions. In some examples, printer 106 may be programmed to print a pattern configured to generate an artificial lotus leaf structure on surface 136.

In some examples, micro-texturing apparatus 100 may further include and/or be connected with sensors and/or other data systems configured to provide and/or evaluate data related to the printing processes. For example, the micro-texturing apparatus may include a camera to capture images of the substrate surface during and/or subsequent to deposition of maskant fluid 118. The images may be analyzed by controller 122 and/or connected computer 134 to evaluate the area and pattern covered by the deposited maskant fluid. Instructions stored on controller 122 or received from computer 134 may initiate additional printing processes based on the evaluation. In some examples, collected data, data analysis and/or evaluations may be stored for later review. Such real-time feedback and stored information may allow immediate and eventual improvements in manufacturing quality.

In some examples micro-texturing apparatus 100 may further include equipment configured to aid performance of further steps of a method of micro-texturing a surface, as described herein. For example, apparatus 100 may include a nozzle assembly and/or reservoir for use with an etchant fluid. For another example, apparatus 100 may include a sprayer for uniform delivery of fluids such as etchants, solvents, or water over surface 136. For another example, apparatus 100 may allow printing platform 104 to be submerged into a bath of fluid such as an etchant, solvent, or a cleanser such as water.

As shown in FIG. 5, micro-texturing apparatus 200 includes a robotic system with a first robotic arm 204 and a second robotic arm 206. Each robotic arm 204, 206 includes a nozzle assembly. In the present example, first robotic arm 204 includes a maskant nozzle assembly 210 and second robotic arm 206 includes an etchant nozzle assembly 212. Maskant nozzle assembly 210 is configured to dispense droplets of a maskant fluid such as a neoprene, a copolymer, and/or a wax. Etchant nozzle assembly 212 is configured to dispense droplets of an etchant fluid such as an acid, a ketone, a solvent, and/or a caustic. Each nozzle assembly may include an inkjet printhead and one or more nozzles. Nozzle assemblies 210 and 212 may also be described as pint engines mounted as end-effectors on robotic arms 204 and 206.

First robotic arm 204 and second robotic arm 206 may each include a separate controller or may be connected to a shared controller. The controller or controllers may be programmable logic controllers, as described in reference to controller 122 of micro-texturing apparatus 100, above. In some examples, the robotic system may include actuators other than arms, may include a single robotic arm supporting multiple nozzles and/or other end effectors, may include an automated gantry, and/or may include any effective moveable supports for the nozzle assemblies.

In the present example, each robotic arm 204, 206 is a six-axis industrial robot. In other words, each arm is articulated to have six degrees of freedom and can rotate around six distinct axes. Apparatus 200 may include any robotic arms and/or systems providing sufficient range of motion to address a selected surface of a workpiece. The six-axis robots of the present example may provide a greatest range of motion, allowing micro-texturing apparatus 200 to be used with a widest variety of surface and workpiece geometries. For micro-texturing methods that do not include application of a maskant, micro-texturing apparatus 200 may include only second robotic arm 206.

In the depicted example, workpiece 202 is a section of an aircraft wing, and an upper flight surface 208 is shown partway through a micro-texturing process. In some examples, workpiece 202 may include a sheet of flexible material unwound from a roll of composite material. In some examples, workpiece 202 may comprise a portion of an assembled aircraft, and micro-texturing apparatus 200 may be positioned adjacent the aircraft. Workpiece 202 may be flat, may have a curvature in a single direction as depicted in FIG. 5, may have complex curvature that is heterogenous over the surface, and/or may have any geometry.

Workpiece 202 may be supported on a work surface, by a portion of micro-texturing apparatus 200, and/or may be self-supporting. Micro-texturing apparatus 200 may be mobile, and robotic arms 204, 206 may be repositionable relative to workpiece 202. The robotic arms may further be repositionable relative to one another. In some examples, micro-texturing apparatus 200 may include a support system appropriate to translate and/or rotate workpiece 202 relative to robotic arms 204, 206. For example, micro-texturing apparatus 200 may be configured to rotate a cylindrical workpiece, to allow access to all areas of the exterior surface by first nozzle assembly 210 and second nozzle assembly 212.

Robotic arm 204 is programmed to print maskant fluid onto flight surface 208 in a pattern 214. The pattern may define a plurality of exposed surface zones 216, which may also be referred to as etching surface regions. Pattern 214 may correspond to the locations of peaks in a micro-texture. In the depicted example, pattern 214 includes a plurality of parallel lines corresponding to the peaks of a plurality of riblets. Robotic arm 206 is programmed to print etchant onto exposed surface zones 216 of flight surface 208. In FIG. 5, surface 208 is shown with a completed pattern 214 of maskant and etchant printed onto three of exposed surface zones 216.

B. Illustrative Method of Micro-Texturing with a Maskant

This section describes steps of an illustrative method for micro-texturing a substrate surface; see FIGS. 6-12. Aspects of micro-texturing printing apparatus described above may be utilized in the method steps described below. Where appropriate, reference may be made to components and systems that may be used in carrying out each step. These references are for illustration, and are not intended to limit the possible ways of carrying out any particular step of the method.

Figure 12:
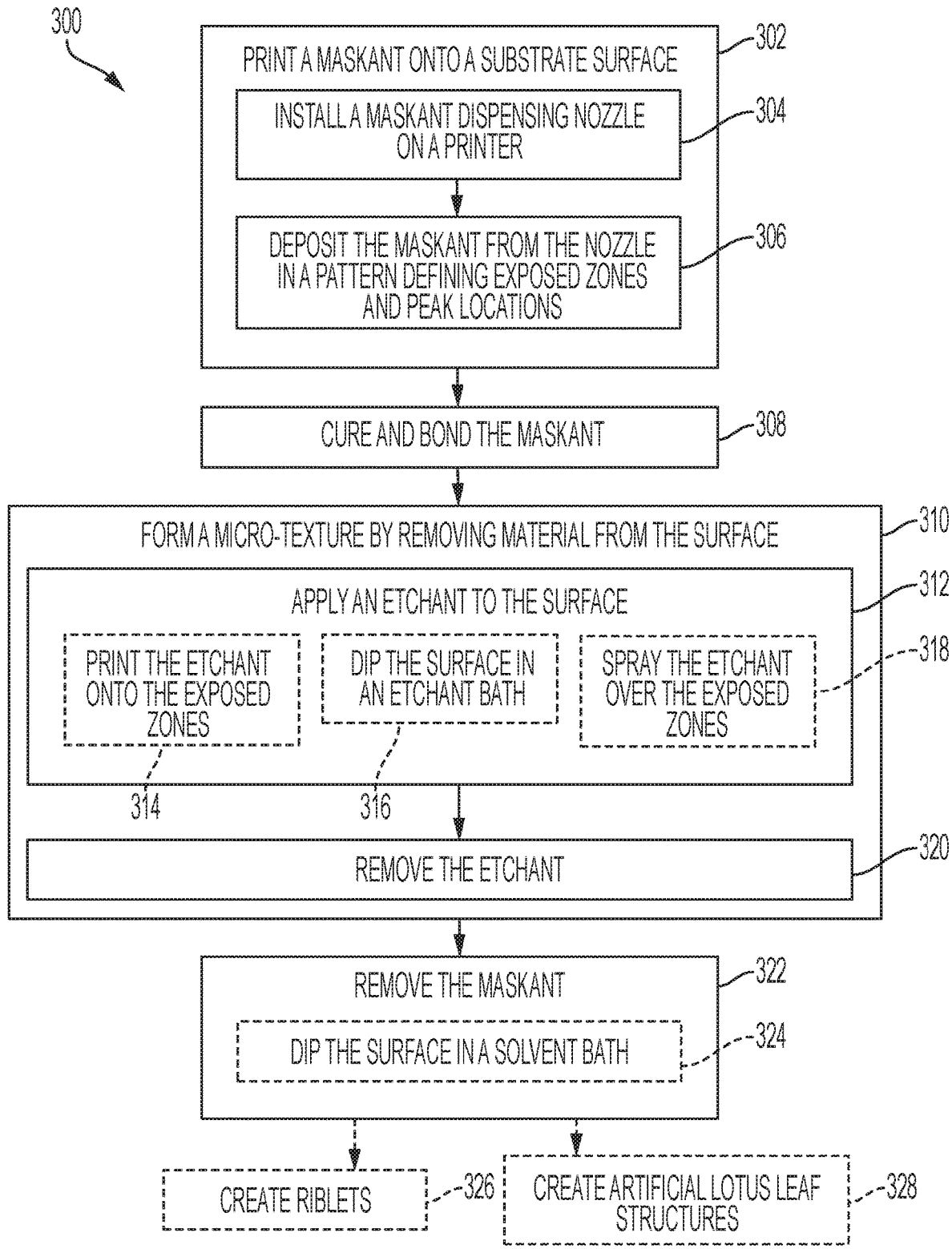
FIG. 12 is a flow chart depicting steps of an illustrative method for micro-texturing a substrate surface according to the present teachings.

FIG. 12 is a flowchart illustrating steps performed in an illustrative method 300, and may not recite the complete process or all steps of the method. Although various steps of method 300 are described below and depicted in FIG. 12, the steps need not necessarily all be performed, and in some cases may be performed simultaneously or in a different order than the order shown.

Figure 6:
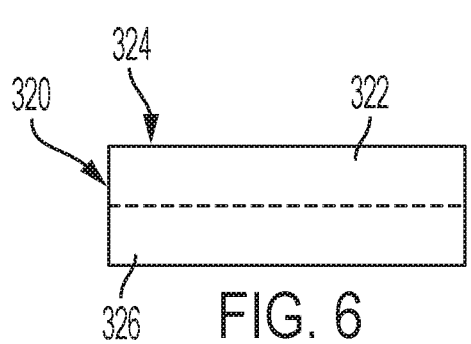
FIG. 6 is a schematic diagram of an illustrative substrate surface.

At step 302, the method includes printing a maskant onto a substrate surface. The substrate may include any workpiece and/or material on which micro-texturing is desired. FIG. 6 is a schematic diagram of an illustrative substrate 320. The substrate includes an upper layer 322 having a top surface 324, and a lower layer 326. Upper layer 322 may be described as a sacrificial layer, and may be selected and/or configured for forming surface features of a micro-texture.

Substrate 320 may be a discrete section of material and/or may be a portion of a larger workpiece. For example, the substrate may be a sheet of composite or may be a section of an aircraft wing skin. In FIG. 6, top surface 324 is shown as flat. Substrate 320 and/or top surface 324 may alternatively or additionally be curved, stepped, and/or have any desired geometry. Substrate 320 may include a single material, may be a composite, and/or may include layers of different materials.

Upper layer 322 and lower layer 326 may be produced together and/or the upper layer may be applied to the lower layer. For example, upper layer 322 and lower layer 326 may comprise a solid block of aluminum alloy. For another example, upper layer 322 and lower layer 326 may each comprise an aluminum alloy, with the upper layer having been applied to the lower layer by an additive manufacturing technique such as Direct Metal Laser Sintering (DMLS). For another example, upper layer 322 may be a cured polymer top-coat, applied to an aluminum alloy lower layer 326. For another example, upper layer 322 and lower layer 326 may comprise a composite material having a polymer matrix material and reinforcing fibers, the upper layer including only matrix material and the lower layer including both matrix material and reinforcing fibers.

Substep 303 of step 302 includes installing a maskant dispensing nozzle on a printer. For example, one or more nozzles configured for use with a selected maskant fluid may be installed into the printhead of a direct-to-shape (DTS) printer. In some examples, an inkjet nozzle may be installed onto another type of printer. For example one or more Drop-On-Demand inkjet nozzles may be installed on the printhead of a Fused Deposition Modeling (FDM) printer, along with a maskant reservoir. Substep 303 may further include any necessary modifications to allow inkjet printing of the maskant.

The printer may be part of a printing apparatus such as micro-texturing apparatus 100 or 200. A printing apparatus may be configured specifically for use in method 300, and/or a generic printing apparatus may be used. A printing apparatus may be selected and/or designed to effectively print on substrate 320.

Substep 304 of step 302 includes depositing the maskant from the nozzle in a pattern defining exposed zones and peak locations. The maskant may be deposited to form a pattern selected according to a desired micro-texture. A pattern may be selected to form a riblet micro-texture, to form an artificial lotus leaf micro-texture, and/or any desired micro-texture.

The maskant may be selected according the material of the substrate and/or the additive layer. In other words, the maskant may be selected to be non-reactive with the material of the surface and to provide sufficient adherence to the surface. The maskant may also be selected according to an intended etchant. In other words, the maskant may be selected to be non-reactive with the etchant, and/or to resist dissolving by the etchant. The maskant may be selected according to desired properties such as low viscosity, quick cure times, and/or strong adhesion. Examples of appropriate maskants include isobutylene-isoprene copolymers such as butyl rubber, chloroprene elastomers such as Neoprene, resins, waxes, and wax-like materials.

Figure 7:
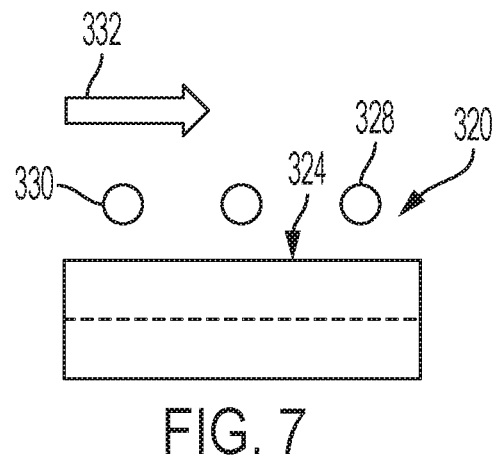
FIG. 7 is a schematic diagram of droplets of a maskant printed onto the substrate surface of FIG. 6.
Figure 8:
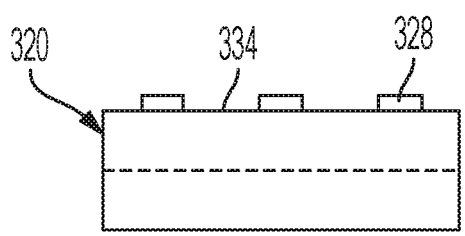
FIG. 8 is a schematic diagram of the maskant droplets cured onto the substrate surface of FIG. 6.
Figure 9:
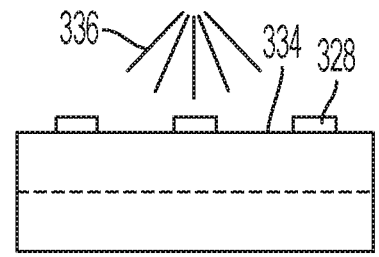
FIG. 9 is a schematic diagram of an etchant sprayed onto the substrate surface of FIG. 6.
Figure 10:
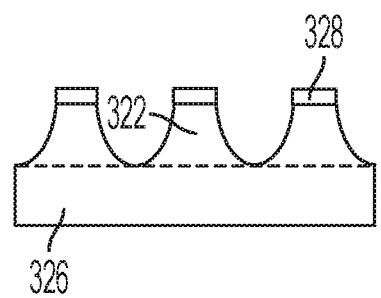
FIG. 10 is a schematic diagram of the substrate surface of FIG. 6, with material removed.

In the example depicted in FIG. 7, droplets 330 of a maskant 328 are dropped onto surface 324 in a regularly spaced pattern as a printhead progresses in a direction indicated by arrow 332. The completed pattern is depicted in FIG. 8. One traversal of the printhead across surface 324 may referred to as a pass. The printhead may repeatedly travel across surface 324, in multiple passes. On each pass, droplets 330 may be dropped in corresponding locations, in order to form a plurality of regularly spaced lines of maskant 328 on the surface. In some examples, droplets 330 may be dropped without spacing in each pass, to form a continuous line. In such examples, the passes may be spaced on surface 324 to similarly form a plurality of spaced lines of maskant 328 on the surface.

Such a pattern may be selected to form a riblet micro-texture. Each continuous line of maskant 328 may define a peak location of a riblet 22 (see FIG. 1). Exposed zones 334 may be defined between the lines, corresponding to a groove 24 between riblets 22. The pattern may be configured to achieve desired parameters of the surface features of the micro-texture. For example, the width of exposed zones 334 may be selected to create riblets having a spacing in a range of 70 to 100 μm, in a range of 10 to 250 μm, or any desired range. To achieve a desired riblet tip width, the size of droplets 330 may be selected. Selecting a droplet size may include selecting a viscosity of maskant 328, configuring one or more nozzles of a printhead, and/or programming a printing apparatus. To achieve a desired micro-texture, a pattern may be designed according to known properties of upper layer 322 and/or maskant 328. For example, droplet spacing may be selected based on a desired riblet spacing and/or based on an expected spread of droplets 330 of surface 324.

Step 305 includes curing and/or bonding the maskant. The maskant may be cured by application of ultra-violet light, by application of heat, by drying, by allowing time to elapse, and/or by any effective method. The maskant may be cured such that effective bonding of the maskant to the substrate surface is achieved.

At step 306, method 300 includes forming a micro-texture by removing material from the surface. Substep 307 includes applying an etchant to the surface. The etchant may be applied in any effective manner. Optional substep 308 includes printing the etchant onto the exposed zones. Similarly to step 302, a printer and/or printing apparatus may be used to perform optional substep 308. Etchant droplets may be printed uniformly over the surface, and/or may be printed according to a pattern of the maskant. For example, the etchant droplets may be deposited to cover exposed surface zones 334 as shown in FIG. 8. Printing the etchant may include dispensing droplets of the etchant from an inkjet nozzle onto the surface. Optional substep 309 includes dipping the surface in an etchant bath. Chemical milling techniques may be used to perform optional substep 309.

Optional substep 310 includes spraying the etchant over the exposed zones. In the example depicted in the schematic diagram of FIG. 9, an etchant 336 is sprayed uniformly over surface 324, including exposed zones 334. The etchant may be sprayed by a printing apparatus used to perform step 302 of method 300, or may be sprayed manually, and/or may be sprayed in any effective manner.

The etchant used in substep 307 may be selected to correspond to the material of the substrate. In the example depicted in FIG. 9, etchant 336 is selected to correspond to upper layer 322 of substrate 320. In other words, etchant 336 may be a fluid chosen to effectively dissolve the material or materials of upper layer 322. For instance, in examples where upper layer 322 comprises aluminum, etchant 336 may be Keller's reagent or a solution of sodium hydroxide. Examples of appropriate etchants include acids such as sulfuric acid, ketones such as acetone, caustics such as sodium hydroxide, or other solvents such as alcohol. Etchant 336 may be a solution and may have a concentration selected to produce a desired etching strength and/or speed on upper layer 322.

Once etchant 336 is applied to surface 324, time may be allowed to elapse before performing further steps. The time to elapse may be chosen according to a desired volume of material to be dissolved by the etchant. For example, a waiting period may be selected such that sufficient volume of material is dissolved to create riblets having heights in a range of 10 to 15 μm, in a range of 1 to 50 μm, or any desired range. For another example, a waiting period may be selected such that material is dissolved down to an interface between upper layer 322 and lower layer 326.

Substep 311 of step 306 includes removing the etchant. Removing etchant 336 may also remove material dissolved in the etchant. Etchant 336 may be removed by washing substrate 320, or by any effective method. For example, water may be sprayed uniformly over surface 324 and/or substrate 320 may be submerged in a water bath. In some examples, substrate 320 may be evaluated prior to proceeding with the method. For example, an operator or technician may inspect the substrate under a microscope and/or a micro-texturing apparatus may capture an image of the substrate surface. The operator, micro-texturing apparatus, and/or a data processing system may evaluate measurements or other data. Based on the evaluation, substep 307 may be repeated prior to proceeding to step 312 of the method.

Figure 11:
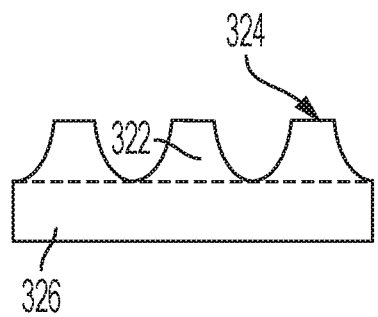
FIG. 11 is a schematic diagram of a micro-texture formed on the substrate surface of FIG. 6, with the maskant removed.

Step 312 of the method includes removing the maskant. An appropriate method of removing the maskant may be selected according to the maskant and the substrate material. For example, optional step 313 includes dipping surface 324 of substrate 320 in a bath of solvent that dissolves maskant 328 but is non-reactive with the material of upper layer 322. Maskant 328 may be removed by the same apparatus as was used to apply the maskant, by another apparatus, and/or by hand. Removing maskant 328 may leave a micro-texture formed in upper layer 322, as shown in FIG. 11. In the depicted example, method 300 has been used to form scalloped riblets in upper layer 322 of substrate 320. The scalloped riblets may also be described as formed in top surface 324.

Either optional step 314 or 316 may be performed, depending on the pattern in which the maskant was applied. Optional step 314 includes creating riblets, or a riblet micro-texture. Optional step 315 includes creating artificial lotus leaf structures, or a lotus leaf micro-texture. The micro-texture may be determined in step 302, according to the selected pattern. The formed micro-texture may be revealed once the etchant and maskant have been removed.

C. Illustrative Aircraft and Associated Method

Figure 13:
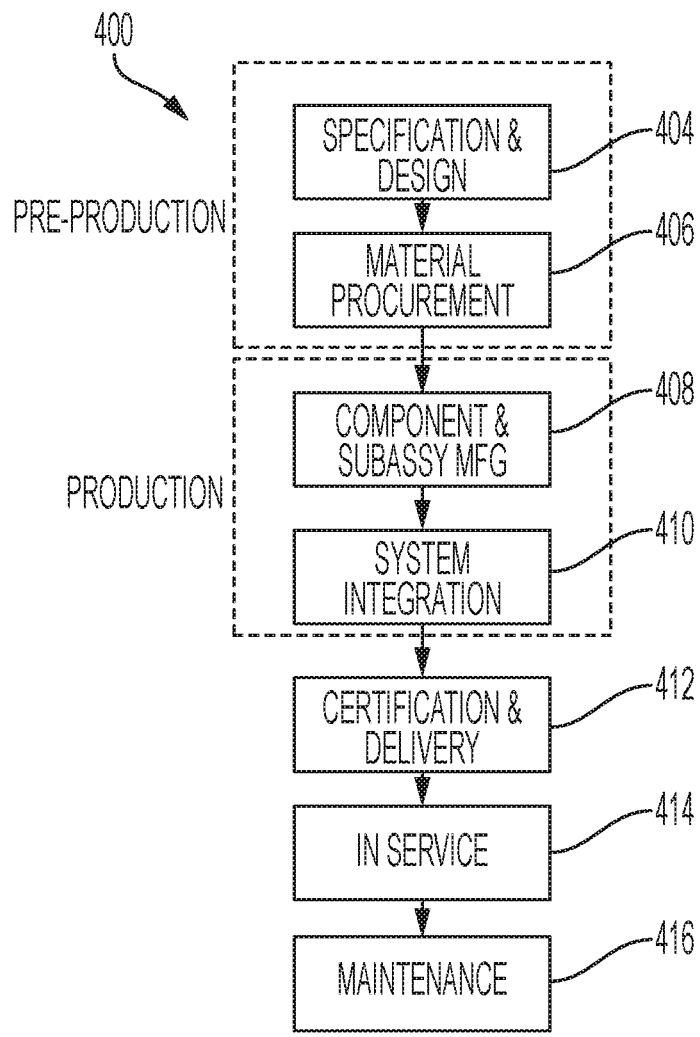
FIG. 13 is a flowchart depicting steps of an illustrative aircraft manufacturing and service method.
Figure 14:
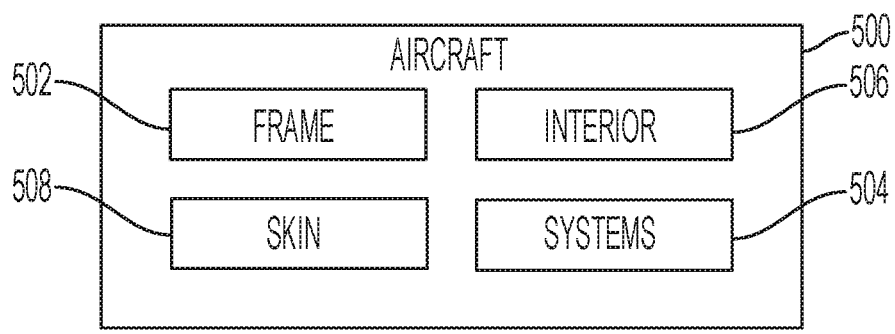
FIG. 14 is a schematic diagram of an illustrative aircraft.

Examples disclosed herein may be described in the context of an illustrative aircraft manufacturing and service method 400 (see FIG. 13) and an illustrative aircraft 500 (see FIG. 14). Method 400 includes a plurality of processes, stages, or phases. During pre-production, method 400 may include a specification and design phase 404 of aircraft 500 and a material procurement phase 406. During production, a component and subassembly manufacturing phase 408 and a system integration phase 410 of aircraft 500 may take place. Thereafter, aircraft 500 may go through a certification and delivery phase 412 to be placed into in-service phase 414. While in service (e.g., by an operator), aircraft 500 may be scheduled for routine maintenance and service 416 (which may also include modification, reconfiguration, refurbishment, and so on of one or more systems of aircraft 500). While the examples described herein relate generally to operational use during in-service phase 414 of aircraft 500, they may be practiced at other stages of method 400.

Each of the processes of method 400 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 14, aircraft 500 produced by illustrative method 400 may include a frame 502 surrounding an interior 506 and covered by a skin 508. The skin may include one or more micro-textured surface zone. The aircraft may further include a plurality of systems 504, such as one or more of a propulsion system, an electrical system, a hydraulic system, and an environmental system. Each system may comprise various subsystems, such as controllers, processors, actuators, effectors, motors, generators, etc., depending on the functionality involved. Any number of other systems may be included. Although an aerospace example is shown, the principles disclosed herein may be applied to other industries, such as the automotive industry, rail transport industry, and nautical engineering industry. Accordingly, in addition to aircraft 500, the principles disclosed herein may apply to other vehicles, e.g., land vehicles, marine vehicles, etc.

Apparatuses and methods shown or described herein may be employed during any one or more of the stages of the manufacturing and service method 400. For example, components or subassemblies corresponding to component and subassembly manufacturing phase 408 may be fabricated or manufactured in a manner similar to components or subassemblies produced while aircraft 500 is operating during in-service phase 414. Also, one or more examples of the apparatuses, methods, or combinations thereof may be utilized during production phases 408 and 410, for example, by substantially expediting assembly of or reducing the cost of aircraft 500. Similarly, one or more examples of the apparatus or method realizations, or a combination thereof, may be utilized, for example and without limitation, while aircraft 500 is at in-service phase 414 and/or during maintenance and service phase 416.

ILLUSTRATIVE COMBINATIONS AND ADDITIONAL EXAMPLES

This section describes additional aspects and features of methods and apparatus for micro-texturing a surface, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A. A method of micro-texturing a substrate surface, comprising:

printing a maskant on a substrate surface to define exposed surface zones on the substrate surface, forming a micro-texture on the substrate surface by removing material from the exposed surface zones, and removing the maskant from the substrate surface.

A1. The method of A, wherein the step of removing material includes dipping the substrate surface in an etchant bath.

A2. The method of A or A1, wherein the step of removing material includes spraying an etchant over the exposed surface zones.

A3. The method of any of A-A2, wherein troughs between micro-riblets are formed in the exposed surface zones.

A4. The method of any of A-A3, wherein the forming step includes creating a lotus leaf micro-texture on the substrate surface.

A5. The method of any of A-A4, wherein the step of removing material includes depositing an etchant on the substrate surface, and removing the etchant from the substrate surface.

A6. The method of A5, wherein the etchant is selected from a group consisting of: acids, ketones, solvents, and caustics.

A7. The method of A5, wherein the step of depositing the etchant includes printing the etchant on to the exposed surface zones.

A8. The method of A7, wherein the etchant is also printed on the maskant.

A9. The method of any of A-A8, wherein the step of removing the maskant includes dipping the substrate surface in a solvent bath.

A10. The method of any of A-A9, further comprising the step of:

curing and bonding the maskant to the substrate surface prior to the forming step.

A11. The method of any of A-A10, wherein the maskant is selected from a group consisting of: neoprene, copolymers, and wax.

A12. The method of any of A-A11, wherein the substrate surface forms an exterior surface of an aircraft.

A13. The method of any of A-A12, wherein the substrate surface is curved.

A14. The method of any of A-A13, wherein the substrate is comprised of a composite material.

A15. The method of any of A-A14, wherein the micro-texture is configured to exhibit a desired fluid dynamic effect.

A16. The method of A15, wherein the micro-texture is configured to exhibit a desired aerodynamic effect.

A17. The method of A15 or A16, wherein the micro-texture is configured to exhibit a desired hydrodynamic effect.

B. An apparatus for creating a micro-texture on a substrate surface, comprising:

a maskant reservoir, a printer including a first nozzle assembly configured to dispense a maskant from the maskant reservoir on to the substrate surface, and a controller programmed to move the first nozzle assembly relative to the substrate surface to deposit the maskant on the substrate surface in a pattern exposing etching surface regions configured for generating a micro-textured surface on the substrate surface.

B1. The apparatus of B, wherein the etching surface regions define locations for spaces between micro-riblets.

B2. The apparatus of B or B1, wherein the controller is programmed to move the first nozzle assembly relative to the substrate surface to define locations of adjacent micro-riblets spaced by a distance in a range of about 70-100 microns.

B3. The apparatus of any of B-B2, wherein the etching surface regions define a lotus leaf micro-texture on the substrate surface.

B4. The apparatus of any of B-B3, further comprising:

a second nozzle assembly, wherein the controller is programmed to move the second nozzle assembly relative to the substrate surface to deposit an etchant on the substrate surface.

B5. The apparatus of B4, wherein the etchant is selected from a group consisting of: acids, ketones, solvents, and caustics.

B6. The apparatus of B5, wherein the controller is programmed to move the second nozzle assembly to deposit the etchant for generating micro-riblets having heights in a range of about 15-50 microns.

B7. The apparatus of any of B-B6, wherein the first nozzle assembly is carried by a six-axis robotic apparatus.

B8. The apparatus of any of B-B7, wherein the printer is an inkjet printer.

B9. The apparatus of any of B-B8, wherein the first nozzle is configured to dispense the maskant, the maskant being selected from a group consisting of: neoprene, copolymers, and wax.

C. A method for generating a micro-texture on a substrate surface, comprising:

connecting a nozzle to a printer, the nozzle being configured to deposit a maskant on to the substrate surface, printing the maskant through the nozzle on to the substrate surface in a pattern defining locations of peaks in the micro-texture, removing material from the substrate surface between the locations of peaks, and removing the maskant from the substrate surface.

C1. The method of C, wherein the peaks comprise micro-riblets.

C2. The method of C or C1, wherein the peaks comprise a portion of a lotus leaf micro-structure.

C3. The method of any of C-C2, wherein the micro-texture includes structure that is too small to be seen by an unaided human eye.

C4. The method of any of C-C3, wherein the micro-texture is configured to exhibit a desired fluid dynamic effect.

C5. The method of C4, wherein the micro-texture is configured to exhibit a desired aerodynamic effect.

C6. The method of C4 or C5, wherein the micro-texture is configured to exhibit a desired hydrodynamic effect.

C7. The method of any of C-C6, wherein the nozzle is mounted on a six-axis robotic apparatus.

ADVANTAGES, FEATURES, AND BENEFITS

The different examples of the methods and apparatus for micro-texturing a surface described herein provide several advantages over known solutions for creating a micro-texture. For example, illustrative examples described herein allow precise, cost-effective manufacture of micro-textured surfaces appropriate for large-scale production.

Additionally, and among other benefits, illustrative examples described herein allow production of durable micro-textures.

Additionally, and among other benefits, illustrative examples described herein add limited manual labor to the assembly process for a vehicle such as an aircraft.

Additionally, and among other benefits, illustrative examples described herein allow micro-texturing of curved surfaces and other complex geometries.

Additionally, and among other benefits, illustrative examples described herein allow production of micro-textures with improved resistance to shear forces.

No known system or device can perform these functions, particularly with simple adaptation of existing printer technologies. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of micro-texturing an exterior flight surface of an aircraft, comprising:
    designating drag-reduction zones on an exterior skin of a painted aircraft,
    printing by an inkjet printer head mounted on a six-axis robotic arm, a maskant on a curved flight surface in a drag-reduction zone to define exposed surface zones on the curved flight surface,
    curing and bonding the maskant to the flight surface,
    applying an etchant on to the exposed surface zones, and
    removing the maskant by washing the flight surface with one or more fluids formulated to remove the etchant and maskant from the flight surface.

2. The method of claim 1, wherein the etchant is selected from a group consisting of: acids, ketones, solvents, and caustics.

3. The method of claim 1, wherein micro-riblets are defined by the printed maskant and troughs between the micro-riblets are formed in the exposed surface zones.

4. The method of claim 1, wherein the maskant is selected from a group consisting of: neoprene, copolymers, and wax.

5. The method of claim 1, wherein the applying step includes etching micro-riblets primarily in designated drag-reduction zones spaced away from leading edge airfoil surfaces of the aircraft.

6. The method of claim 1, wherein the step of applying an etchant includes selectively printing etchant droplets onto the exposed surface zones to remove material from the exposed surface zones.

7. The method of claim 1, wherein the step of printing by an inkjet printer includes dispensing maskant droplets from a print head, wherein a size of the maskant droplet defines a spacing between the exposed surface zones.

8. The method of claim 1, wherein the applying step creates micro-riblets on the exposed surface zones, the step of printing by an inkjet printer includes dispensing maskant droplets from the printer head, and a size of the maskant droplet defines a tip width of the micro-riblets.

9. The method of claim 8, wherein the tip width of the micro-riblets varies with distance from a leading edge of an airfoil.

10. The method of claim 9, wherein the tip width of the micro-riblets increases with increasing distance from the leading edge of the airfoil.

11. The method of claim 1, further comprising:
    acquiring data from a sensor directed at a portion of the flight surface after the applying step,
    analyzing the data to determine an extent of etching.

12. The method of claim 11, further comprising:
    adjusting the applying step based on the extent of etching determined in the analyzing step.

13. The method of claim 11, wherein the sensor includes a camera.

14. A method for generating a micro-texture on an exterior flight surface of an aircraft, comprising:
    connecting a nozzle to an inkjet printer head mounted on a six-axis robotic arm, the nozzle being configured to deposit a maskant on a curved painted exterior flight surface,
    printing the maskant through the nozzle onto the curved painted exterior flight surface in a pattern defining locations of peaks in the micro-texture,
    curing and bonding the maskant to the flight surface,
    applying an etchant onto the flight surface, and
    removing the maskant by washing the flight surface with one or more fluids formulated to remove the etchant and the maskant from the flight surface.

15. The method of claim 14, wherein the etchant is selected from a group consisting of: acids, ketones, solvents, and caustics.

16. The method of claim 14, wherein the maskant is selected from a group consisting of: neoprene, copolymers, and wax.

17. The method of claim 14, wherein the peaks comprise micro-riblets.

18. The method of claim 17, wherein a tip width of the micro-riblets increases with increasing distance from a leading edge of an airfoil.

19. The method of claim 14, wherein the micro-texture is configured to exhibit a desired fluid dynamic effect.

20. The method of claim 19, wherein the micro-texture is configured to exhibit a desired aerodynamic effect.

* * * * *